(12) United States Patent
Tucker et al.

(10) Patent No.: US 11,235,635 B2
(45) Date of Patent: Feb. 1, 2022

(54) ACTIVE SUSPENSION WITH STRUCTURAL ACTUATOR

(71) Applicant: ClearMotion, Inc., Billerica, MA (US)

(72) Inventors: Clive Tucker, Charlestown, MA (US); Zackary Martin Anderson, Cambridge, MA (US); David Michael Lewis, Burlington, MA (US); Ross J. Wendell, Medford, MA (US); Alexander Apostolos Alexandridis, Orchard Lake Village, MI (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 16/589,726

(22) Filed: Oct. 1, 2019

(65) Prior Publication Data

US 2020/0198433 A1 Jun. 25, 2020

Related U.S. Application Data

(60) Division of application No. 15/827,126, filed on Nov. 30, 2017, now Pat. No. 10,471,798, which is a
(Continued)

(51) Int. Cl.
| | |
|---|---|
| *B60G 17/08* | (2006.01) |
| *B60G 17/04* | (2006.01) |
| *F16F 9/36* | (2006.01) |

(52) U.S. Cl.
CPC ............ *B60G 17/08* (2013.01); *B60G 17/04* (2013.01); *B60G 2202/413* (2013.01);
(Continued)

(58) Field of Classification Search
CPC .. B60G 17/08; B60G 17/04; B60G 2202/413; B60G 2202/416; B60G 2600/182
(Continued)

(56) References Cited

U.S. PATENT DOCUMENTS

| | | | |
|---|---|---|---|
| 3,606,601 A * | 9/1971 | White, Jr. et al. | F04C 2/104 418/61.3 |
| 4,857,755 A | 8/1989 | Comstock | |

(Continued)

FOREIGN PATENT DOCUMENTS

| | | |
|---|---|---|
| DE | 199 20 109 A1 | 11/2000 |
| DE | 10 2004 056610 A1 | 6/2006 |

(Continued)

OTHER PUBLICATIONS

Definition of "structural", https://www.thefreedictionary.com/structural, Nov. 29, 2020.*

(Continued)

*Primary Examiner* — Keith J Frisby
(74) *Attorney, Agent, or Firm* — Wolf, Greenfield & Sacks, P.C.

(57) ABSTRACT

An active suspension system is configured in a strut arrangement. The active suspension system comprises a hydraulic actuator and a hydraulic pump/electric motor assembly, wherein the actuator movement is preferably in lockstep with the hydraulic motor-pump and electric motor-generator combination. Torque in the electric motor is instantaneously controlled by a controller to create an immediate force change on the hydraulic actuator. The hydraulic actuator is configured so that it can be used as a strut whereby the actuator has sufficient structural rigidity to carry the applied suspension loads while capable of supplying damper forces in at least three quadrants of the force velocity graph of the suspension actuator operation. Embodiments disclosed include low cost active suspension systems for a MacPherson strut application.

13 Claims, 9 Drawing Sheets

Related U.S. Application Data continuation of application No. 14/786,414, filed as application No. PCT/US2014/035199 on Apr. 23, 2014, now Pat. No. 9,855,814, which is a continuation-in-part of application No. PCT/US2014/029654, filed on Mar. 14, 2014.

(60) Provisional application No. 61/974,406, filed on Apr. 2, 2014, provisional application No. 61/815,251, filed on Apr. 23, 2013.

(52) U.S. Cl.
CPC .... *B60G 2202/416* (2013.01); *B60G 2500/10* (2013.01); *B60G 2500/20* (2013.01); *B60G 2600/182* (2013.01); *F16F 9/367* (2013.01)

(58) Field of Classification Search
USPC .............. 280/124.16, 124.161, 5.5; 701/37
See application file for complete search history.

(56) References Cited

U.S. PATENT DOCUMENTS

| | | | |
|---|---|---|---|
| 5,028,073 A | | 7/1991 | Harms et al. |
| 5,295,563 A | | 3/1994 | Bennett |
| 5,329,767 A | | 7/1994 | Hewett |
| 5,350,983 A | * | 9/1994 | Miller ................ B60G 17/002 318/400.08 |
| 5,682,980 A | | 11/1997 | Reybrouck |
| 6,519,939 B1 | | 2/2003 | Duff |
| 7,051,526 B2 | | 5/2006 | Geiger |
| 7,513,490 B2 | | 4/2009 | Robertson |
| 7,631,736 B2 | | 12/2009 | Thies et al. |
| 7,883,546 B2 | | 2/2011 | Kazerooni et al. |
| 7,963,377 B2 | | 6/2011 | Quinn et al. |
| 8,776,961 B2 | | 7/2014 | Mori et al. |
| 9,108,484 B2 | | 8/2015 | Reybrouck |
| 2003/0077183 A1 | | 4/2003 | Franchet et al. |
| 2007/0089924 A1 | | 4/2007 | de la Torre et al. |
| 2007/0233279 A1 | | 10/2007 | Kazerooni et al. |
| 2008/0111324 A1 | | 5/2008 | Davis |
| 2008/0190104 A1 | | 8/2008 | Bresie |
| 2008/0257626 A1 | | 10/2008 | Carabelli et al. |
| 2009/0260935 A1 | | 10/2009 | Avadhany et al. |
| 2010/0044978 A1 | | 2/2010 | Delorenzis et al. |
| 2010/0072760 A1 | | 3/2010 | Anderson et al. |
| 2010/0262308 A1 | | 10/2010 | Anderson et al. |
| 2012/0234638 A1 | | 9/2012 | Ellifson et al. |
| 2014/0265168 A1 | | 9/2014 | Giovanardi et al. |

FOREIGN PATENT DOCUMENTS

| | | |
|---|---|---|
| DE | 10 2010 023434 A1 | 12/2011 |
| WO | 2008/100830 A1 | 8/2008 |
| WO | 2010/066416 A1 | 6/2010 |
| WO | 2011/159874 A2 | 12/2011 |
| WO | WO 2011/159874 A2 * | 12/2011 |
| WO | 2014/145018 A2 | 9/2014 |

OTHER PUBLICATIONS

International Search Report and Written Opinion dated Nov. 19, 2014 in connection with International Application No. PCT/US2014/035199.
U.S. Appl. No. 14/786,414, filed Mar. 1, 2016, Tucker et al.
U.S. Appl. No. 15/827,126, filed Nov. 30, 2017, Tucker et al.
PCT/US2014/035199, Nov. 19, 2014, International Search Report and Written Opinion.

\* cited by examiner

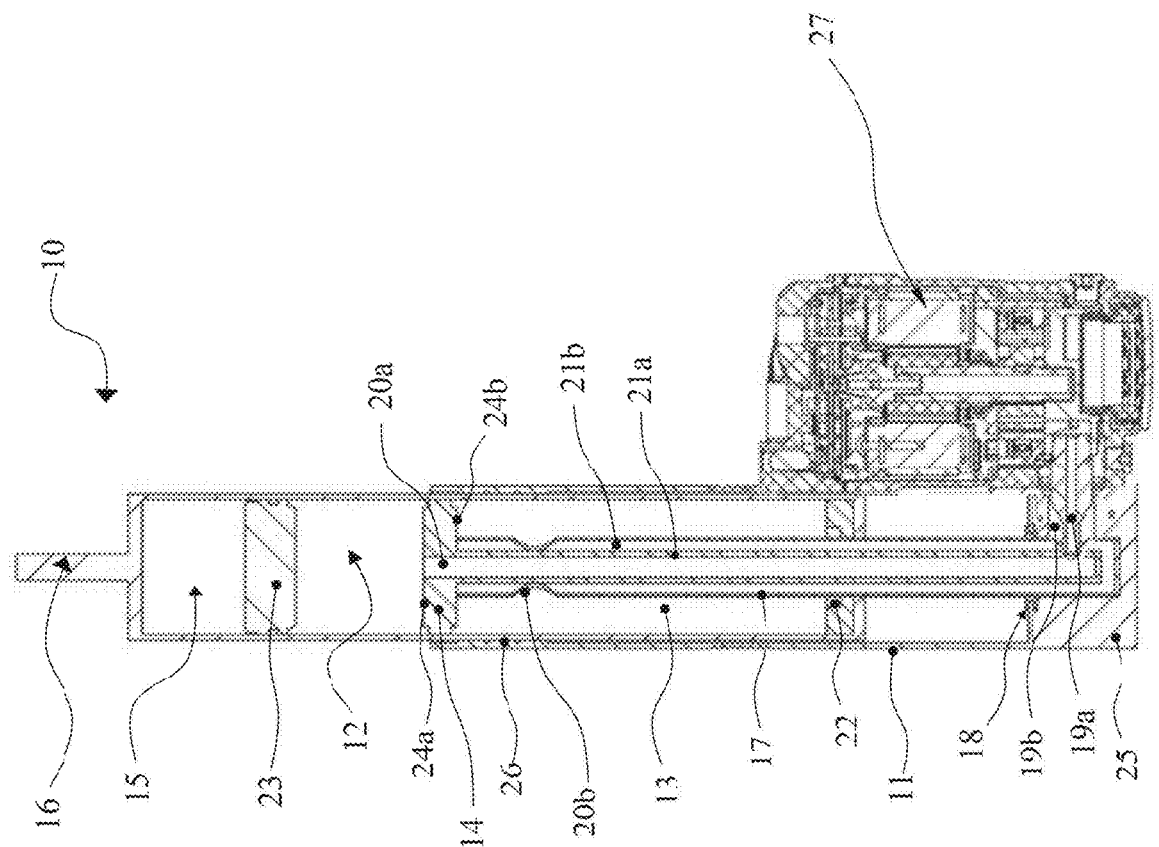

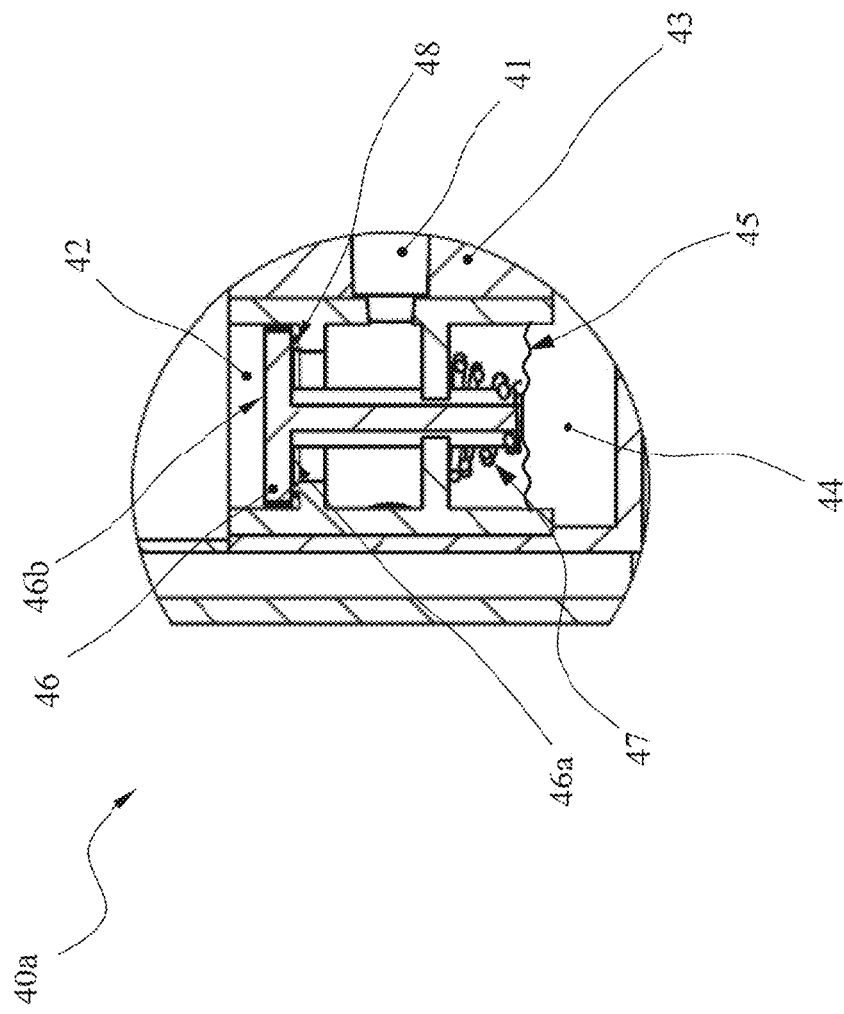

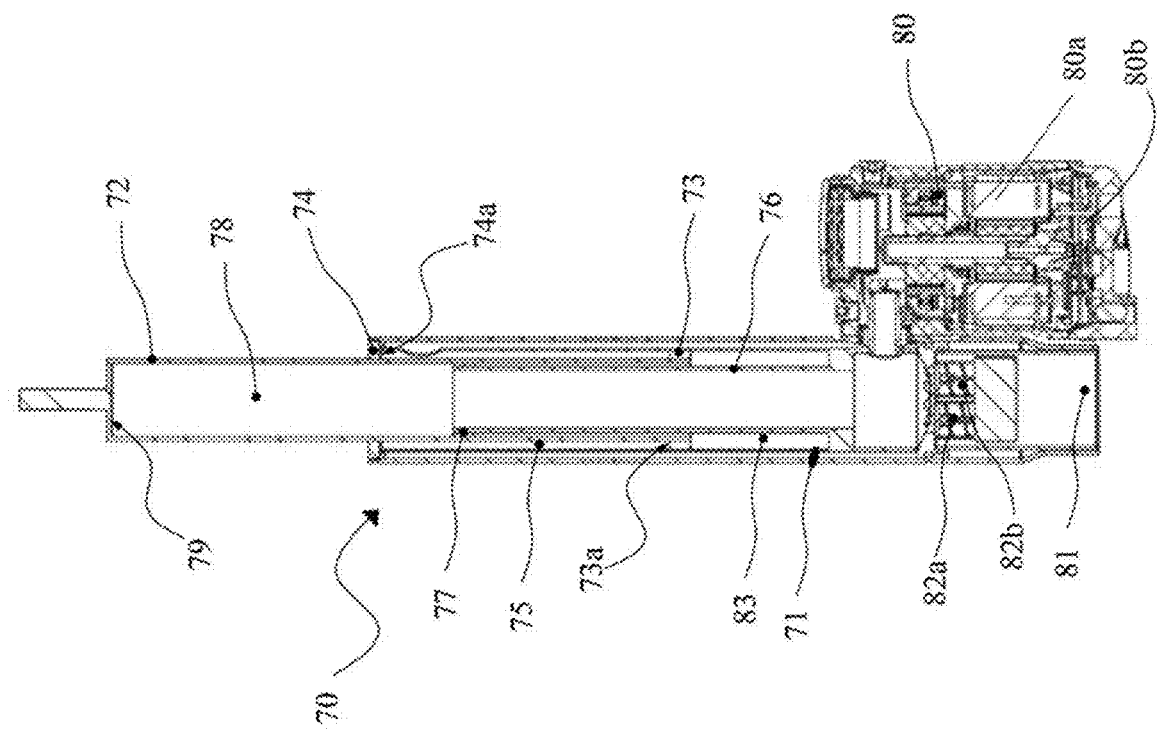

ACTIVE SUSPENSION WITH STRUCTURAL ACTUATOR

CROSS-REFERENCE TO RELATED APPLICATIONS

This application is a divisional of U.S. application Ser. No. 15/827,126, filed Nov. 30, 2017, which is a continuation of U.S. application Ser. No. 14/786,414 filed Mar. 1, 2016, which is a national stage filing under 35 U.S.C. § 371 of international application number PCT/US2014/035199 filed Apr. 23, 2014, which is a continuation in part of international application number PCT/US2014/029654 filed Mar. 14, 2014, and also claims the benefit under 35 U.S.C. § 119(e) of U.S. provisional application Ser. No. 61/815,251 filed Apr. 23, 2013 and Ser. No. 61/974,406 filed Apr. 2, 2014, each of which is hereby incorporated by reference herein in its entirety.

INCORPORATION BY REFERENCE

All references, including publications, patent applications and patents cited herein are hereby incorporated by reference in their entireties to the extent allowable to the same extent as if each reference was individually and specifically indicated to be incorporated by reference and was set forth in its entirety.

FIELD

The present invention relates to active suspension systems and more specifically to active strut configuration suspensions.

BACKGROUND

The majority of suspension systems for vehicles on the road today are passive. These systems utilize multiple linkages, springs and shock absorbers (dampers), which dissipate energy imparted by the wheels to the vehicle body. They play a critical role in the comfort, handling and road holding ability that is provided by a vehicle. One of the key elements of a suspension system is the shock absorber or damper. Conventional dampers are used only to dissipate the kinetic energy that is imparted to the vehicle suspension, for example, by irregularities in the road surface such as bumps and potholes.

A typical damper in a passive system is designed to only dissipate energy. It includes a piston in a cylinder that is rigidly attached to and supported by a longitudinal piston rod. The piston and shaft combination is moveable in both a compression stroke, where the piston moves further into the body of the damper, and an extension or rebound stroke, where the piston moves in the opposite direction. In a conventional suspension system, road induced vertical wheel motion causes the piston within the damper to travel axially relative to and within the cylinder in a manner that forces a viscous fluid, contained in the cylinder, through various restrictive orifices. This process causes the road induced energy in the suspension to be dissipated.

The force on the piston face opposite the shaft (hereinafter referred to as the "front piston face") is determined by multiplying the fluid pressure with the cross-sectional area of the piston that is perpendicular to the longitudinal axis of the cylinder. However, the force on the piston face on the side which is attached to the shaft (hereinafter referred to as the "rear piston face") is determined by multiplying the fluid pressure with the annular area determined by the difference in the cross-sectional piston area perpendicular to the longitudinal axis of the cylinder and the cross-sectional area of the shaft.

When operated within design tolerances (i.e. without overheating), the performance of a damper in a passive system is largely fixed and determined by its structure and the physical properties of the viscous fluid and damping valves used. Therefore, comfort, handling and road holding ability offered by a particular vehicle model remains largely unvarying. This limitation has been ameliorated to a limited extent by the introduction of adaptive suspension systems. Adaptive suspensions are still largely passive systems in that they still can only react to road induced forces except that these systems are able to alter system behavior such as, for example, by changing the firmness of the suspension.

Active suspension systems, on the other hand, introduce much greater flexibility and control by utilizing the damper, or shock absorber element, as an actuator, i.e. a forcing (pushing and pulling) and damping (retarding) device. Active suspensions (sometimes referred to as active dampers) are not only capable of damping road induced forces, but also of generating and applying active forces in real time.

MacPherson struts are a specific class of dampers used in many vehicle suspension systems where the damper is arranged between the vehicle body and its wheel assembly. A strut simultaneously acts as a structural member of the suspension system and a damping element. Therefore, it is exposed to significant transverse forces and bending moments. Although use of a strut suspension allows for an economical system, the side loading on the damper piston rod and damper housing necessitates that the piston rod diameter and bearing arrangement be larger than in non-strut damper applications. This results in a larger difference between front and rear piston face areas. Because of this area difference, when the damper is compressed, the volume of oil displaced by the piston cannot be accommodated by the volume made available from behind the piston. On the other hand, when the damper is extended or rebounds, the volume of fluid displaced by the back face of the piston cannot supply sufficient oil to fill the volume opened up by the motion of the front face of the piston. Therefore, conventional strut dampers are normally of the 'twin tube' passive or semi-active configurations whereby the excess or deficit in hydraulic fluid is accommodated via a low-pressure reservoir that is in fluid communication with the compression and/or extension chambers via passive or semi-active valving. The compression chamber is defined as the fluid filled volume in front of the piston, while the extension chamber is the fluid filled volume that is behind the piston.

Conventional systems use a low pressure 'twin-tube' arrangement where the excess hydraulic fluid is stored in a low pressure reservoir until it is needed. However, active systems typically must utilize high hydraulic pressures in order to provide the required forces in both directions. Consequently, in an active strut system, elevated reservoir pressures are oftentimes needed.

However, the larger piston rod diameter of a strut damper results in a greater mismatch between the front piston face area and the rear piston face area. When the damper is in a neutral state, i.e. not being exposed to longitudinal forces, the front and rear of the piston are typically exposed to reservoir pressure. Therefore, because of the area mismatch, an unbalanced force is applied to the damper piston which would tend to cause the damper to extend, resisted only by the force of the suspension spring and vehicle weight. The situation is made substantially more problematic during use when as the damper temperature increases. As the oil and reservoir gas expands reservoir gas pressure may reach 150 bar (approximately 2200 psi) or more due to thermal expansion.

Active suspension systems apply energy to the suspension in response to various road loads applied to a wheel in order to improve vehicle dynamics, occupant comfort and safety. In order to achieve a desired level of suspension performance, an active suspension system needs to have energy either already present or capable of being provided at an appropriate time. In the case of hydraulic systems, the necessary energy corresponds to a necessary hydraulic pressure and flow rate. A conventional approach used in hydraulic active suspension systems, to ensure that energy is applied in a timely manner, is a continuously operating pump that provides a desired hydraulic pressure and flow.

These types of systems control the fluid flow and pressure provided by continuously operating the pump either by controlling the displacement of the pump and/or using one or more electronically controlled valves to control the fluid flow and pressure from the pump to the actuator. Some systems, especially systems including fixed displacement pumps, use valves to bypass the actuator or fill the compression and rebound chambers. However, it should be noted that in some hydraulic systems, the speed of the pump may be rapidly adjusted to increase or decrease the hydraulic flow and/or pressure. Hydraulic suspension systems are typically powered using a hydraulic actuator associated with a remotely located hydraulic power source used to transfer hydraulic fluid to and from the actuator via an arrangement of hydraulic hoses or tubes. Hydraulic power sources may include various components including, for example, an electric motor and pump assembly as well as a fluid reservoir.

SUMMARY

It is an object of this invention to provide a hydraulic actuator for an active strut assembly for a vehicular suspension system. It is a further object of this invention to provide an active strut assembly for a vehicular suspension system wherein the neutral state force imbalance between the front face and rear face of a damper piston is minimized. It is a yet further object of this invention to provide an active strut assembly for a vehicular suspension system, with an internal gas reservoir and a hollow piston rod. It is a yet further object of this invention to provide an active strut assembly with an integral hydraulic motor-pump and electric motor-generator.

The active suspension system of the invention may reduce the required overall reservoir gas pressure necessary to provide damping or to provide force for an active extension or compression stroke. Certain embodiments can eliminate the need for this high-pressure gas force entirely. These mechanical improvements are provided while implementing a strut as an active suspension system. It is a further object of the invention to provide a less expensive strut assembly able to take side load without significantly compromising active suspension performance. This active suspension architecture of the invention is more economical to produce than many other active suspension system architectures.

It is still another object of the invention to provide an active suspension system with mechanical improvements to the traditional strut design and to respond to road inputs and create a smoother vehicle ride with better handling. It is an object of the invention to provide an active strut that can be seamlessly integrated into many vehicle suspension systems as they are currently designed and manufactured.

It is yet another object of the invention to provide an annular piston rod reducing the difference in effective area of the two piston faces, reducing the overall gas force of the system, while maintaining the structural rigidity necessary to support the vehicle chassis and control wheel movement as implemented by the active suspension.

It is a further object of the invention to provide an active suspension strut using a lower maximum gas force by increasing the volume of the gas chamber. This improvement allows the overall pressure change in the chamber to be less with each unit of distance moved by the piston head, reducing the overall change in pressure in the chamber and therefore the chamber's maximum pressure.

It is still a further object of the invention to provide an active strut which may be implemented with no central DC/DC or energy storage and can use power from any voltage source available in a vehicle. For example, the active strut could be powered off a 12V vehicle battery or off a 48V power electronic system. Using these systems to power the active strut reduces costs because it eliminates the need for electrical energy storage within the active suspension system itself.

It is still another object of the invention to provide a strut that utilizes a smaller motor, as compared to a motor in a typical active suspension actuator architecture. In some embodiments this may be implemented with "smart" passive valving, such as, for example, a specifically-tuned diverter valve. A smaller motor reduces overall system cost because fewer materials and parts are required for production. This smaller motor would typically spin faster at a given actuator velocity in order to produce force while compensating for its reduced size.

The diverter valve may be constructed and arranged to divert a portion of the fluid flow between the compression volume and the extension volume past the hydraulic motor-pump, and it might also be used to limit a pressure, flow, and/or amount of energy applied to the hydraulic motor-pump. The diverter valve may be configured to activate at a preset fluid flow rate (i.e. a fluid diversion threshold) and may divert hydraulic fluid away from the hydraulic motor-pump in response to the hydraulic fluid flowing at a rate that exceeds the fluid diversion threshold. The fluid diversion threshold may be selected so that the maximum safe operating speeds of the hydraulic motor-pump and electric motor are never exceeded, even at very high speed suspension events. When the diverter activates and enters the diverted flow mode, fluid flow to the hydraulic motor-pump is restricted, and a controlled split flow path is created so that fluid flow can bypass the hydraulic pump in a controlled manner, thereby creating a damping force on the actuator so that wheel damping is achieved when the diverter valve is in the diverted flow mode. A diverter valve may be incorporated to operate in at least one of the compression and rebound (extension) stroke directions. The diverter valve(s) may be located in at least one of the extension and compression volumes or elsewhere in the hydraulic circuit.

It is still another object of the invention to eliminate the need for vehicle body accelerometers. The elimination of these components reduces the overall system cost and enable the active strut to be implemented as part of a low cost active suspension system.

It is still another object of the invention to provide an active strut that utilizes a low-pressure twin-tube with a base-mounted hydraulic motor-pump configuration. Packaging the valve and strut together in a housing provides increased durability and allows for a compact form factor. This configuration may integrate seamlessly with current vehicle suspension system designs.

It is yet a further object of this invention to provide an active suspension system capable of providing on demand power which may reduce energy consumption since it does not require continuously operating a pump. A hydraulic system capable of providing on demand power may include a hydraulic actuator body, a hydraulic motor-pump, an associated electric motor-generator operatively coupled to the hydraulic motor-pump, and a controller. Additionally, the hydraulic motor-pump may be operated in lockstep with the hydraulic actuator. In this manner, the energy delivery to the electric motor may rapidly and directly control a pressure applied to, and thus the response of, the hydraulic actuator without the need for ancillary electronically controlled valves. A hydraulic system capable of providing on demand power may also reduce the complexity of a system while providing a desired level of performance.

According to one aspect, an active suspension system includes, for example, a hydraulic motor-pump with two ports. Also included is an actuator assembly with a first end, a second end, and an internal volume which includes a rebound volume and a compression volume. The actuator assembly also includes a piston which separates the rebound volume from the compression volume. A hollow piston rod, which is connected to the piston, includes at least two conduits. One conduit connects the compression volume to one of the ports of the hydraulic motor-pump. The second conduit connects the rebound volume to the second port of the hydraulic motor-pump. The conduits in the piston rod may have, for example, a circular or an annular cross-section. The system may include a reservoir that may be at least partially filled with a compressible material, for example, a gas such as nitrogen, argon or air. An actuator housing may be included which comprises a substantially cylindrical cavity, with a substantially open first end, and a second end with an attachment surface. The actuator assembly may be slidably held in the cavity while the piston rod is axially supported with a radially flexible joint attached to the attachment surface at the second end of the housing. The actuator housing and actuator assembly may comprise or be a part of a vehicle strut. The hydraulic motor-pump, which may be a gerotor hydraulic motor-pump, is drivingly connected to an electric motor-generator. The hydraulic motor-pump, electric motor-generator and control electronics may be consolidated into an integral unit. The hydraulic motor-pump and electric motor-generator may operate in as many as three or four of the quadrants of the force velocity domain of the actuator. A hydraulic valve may be added to the system to limit the operating speed of the motor-pump.

According to another aspect, an active suspension system includes a structural strut actuator, which includes a hydraulic motor-pump with a first port and a second port, an electric motor-generator drivingly connected to said hydraulic motor-pump, and an actuator housing. The actuator includes a cylinder, at least a part of which is divided into a rebound volume and a compression volume by a piston that is slidably received in the cylinder. The piston is attached to a piston rod. The rebound volume is in fluid communication with the first port and the compression volume is in fluid communication with the second port. The system may include a low pressure reservoir and a control system that connects the reservoir to the port that has the lower pressure. A strut may be reinforced by, for example, increasing the piston rod diameter, using an annular piston rod that has a cross-section with a stiffer bend tolerance (better structural rigidity), or by placing the actuator in a ruggedized housing adapted to accommodate a side-load from the suspension. The strut actuator may be configured to operate as a load bearing element of a suspension system. The control system may include, for example, an electronically controlled valve (such as a solenoid valve), a pressure actuated valve (such as a blowoff or pilot-operated valve), an inertial valve (such as a spool valve actuated by external inertial force), or some combination of valves and other fluid control devices. A pilot valve may be a pilot operated shuttle valve. The reservoir may be formed, at least partially, to be an annular volume that surrounds at least a portion of the actuator cylinder. An annular volume surrounding the actuator cylinder may also be used to connect either the compression or the rebound volume to the appropriate ports of the hydraulic motor-pump. The reservoir may contain a gas liquid interface or the gas and the liquid may be separated by a piston or a flexible material. The strut may be configured to withstand operational loads that are directed at an angle to the longitudinal axis of the piston rod (transverse or side forces) and to also withstand moments with axes that are at an angle to the longitudinal axis of the piston rod.

According to yet another aspect, an active strut system of a vehicle is attached to the wheel assembly and to the body of a vehicle. The strut system includes a hydraulic actuator comprising a rebound volume and a compression volume divided by a piston which is attached to a piston rod. A hydraulic motor-pump is included which has a first port that is connected to the rebound chamber volume and a second port connected to the compression chamber. The hydraulic motor-pump controls the rebound and compression motion of the hydraulic actuator. An electric motor-generator is drivingly coupled to the hydraulic motor-pump. A controller electrically coupled to the electric motor-generator may be used to operate the actuator in at least three of four quadrants of a force velocity domain of the hydraulic actuator. The strut system may be configured to tolerate side-loading from said wheel assembly and said body. The hydraulic motor-pump, the electric motor-generator (for example see 31c in FIG. 3a, 80a in FIG. 5a, 80a in FIG. 5b, and 101a in FIG. 6), and control electronics may be an integral unit attached to the strut system. The integral unit is formed by closely coupling the motor-generator and the motor-pump and housing them in a single unit with the controller electronics (for example see 31d in FIG. 3a, 80b in FIG. 5a, 80b in FIG. 5b, and 101b in FIG. 6). In a co-housed configuration, at least the hydraulic motor-pump and the electric motor-generator share a common housing with the hydraulic actuator (such as, for example, side-mounted, base-mounted, or piston head mounted configurations). The active strut system, including the hydraulic actuator, hydraulic motor-pump, and electric motor-generator, may be preferably packaged to fit in the wheel well of the vehicle. Additionally, the active strut system may be coupled with, for example, a mechanical coil, a leaf spring, or an air spring (such as a folding rubber bellow active air spring surrounding at least a portion of the strut).

The hydraulic motor-pump may be used to dampen, or retard, the motion of the piston or assist its motion (actively drive or push/pull) in both the compression and rebound modes. It is preferred that the response time of the system be less than 100 milliseconds, more preferred that it be less than 50 milliseconds, and yet more preferred that it be less than 25 milliseconds.

According to yet another aspect, a low cost active suspension strut is configured such that a triple tube arrangement comprises a low-pressure reservoir in one of the two outer tubes, a base-mounted activalve in fluid communication with the compression volume, and with the rebound volume via a concentric tube passageway, and a valve assembly that keeps the reservoir volume in fluid communication with the lower pressure of the compression or rebound chambers. A controller is integral to the activalve housing (and therefor with the electric motor-generator), and connects directly to a vehicle electrical system (e.g. 12V). The electric motor-generator in the activalve may be sized smaller than in a typical active suspension, and run with a high motion ratio such that movement of the piston creates a high rotational velocity of the electric motor-generator. Hydraulic valving such as a diverter valve limits maximum motor speed, and an electronically controlled or passively controlled force velocity characteristic is affected beyond this speed range. This embodiment may be used in conjunction with one or more anti-roll bars of the vehicle to assist with roll holding force. The anti-roll bar may be, for example, conventional, tuned to provide a specific roll stiffness, or configured to provide hysteretic performance wherein minimal anti-roll force is provided by the bar for small roll angles.

One or more hydraulic valves may be located in parallel, series, or parallel and series relationship to the hydraulic motor-pump in order to bypass fluid under certain circumstances and protect the pump from over-speeding. The hydraulic valves may be, for example, one or more diverter valves, velocity sensitive throttle valves in conjunction with a blow off valve, or electronically controlled solenoid valves. A reservoir is preferably included in the system that can accommodate piston rod volume. The fluid used in such active systems may be, for example, conventional hydraulic shock absorber fluid or fluid with controllable properties (such as magnetorheological and electrorheological fluid wherein viscosity can be controllably altered).

It should be appreciated that the foregoing concepts, and additional concepts discussed below, may be arranged in any suitable combination, as the present disclosure is not limited in this respect. It should be further understood, however, that the invention(s) are not limited to the precise arrangements, variants, structures, features, embodiments, aspects, methods, advantages, improvements, and instrumentalities shown, and the arrangements, variants, structures, features, embodiments, aspects, methods, advantages, improvements, and instrumentalities shown and/or described may be used singularly in the system or method or may be used in combination with other arrangements, variants, structures, features, embodiments, aspects, methods, and instrumentalities. Further, other advantages and novel features of the present disclosure will become apparent from the following detailed description of various non-limiting embodiments when considered in conjunction with the accompanying figures.

In cases where the present specification and a document incorporated herein by reference include conflicting and/or inconsistent disclosure, the present specification shall control. If two or more documents incorporated by reference herein include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2 is a representation of an exemplary active suspension strut element with a hollow piston rod.

FIG. 3b is a representation of an exemplary pilot valve used in the hydraulic circuit shown in FIG. 3a.

FIG. 5a is a representation of an exemplary active strut hydraulic circuit with an actuator including an annular piston and piston rod.

DETAILED DESCRIPTION

Certain exemplary embodiments will now be described to provide an overall understanding of the principles of the structure, function, manufacture and use of the system and methods disclosed herein. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention is defined solely by the claims. The features illustrated or described in connection with one exemplary embodiment may be combined with features of other embodiments and these features may be used individually, singularly and/or in various combinations. Such modifications are intended to be included within the scope of the present invention.

Figure 1:
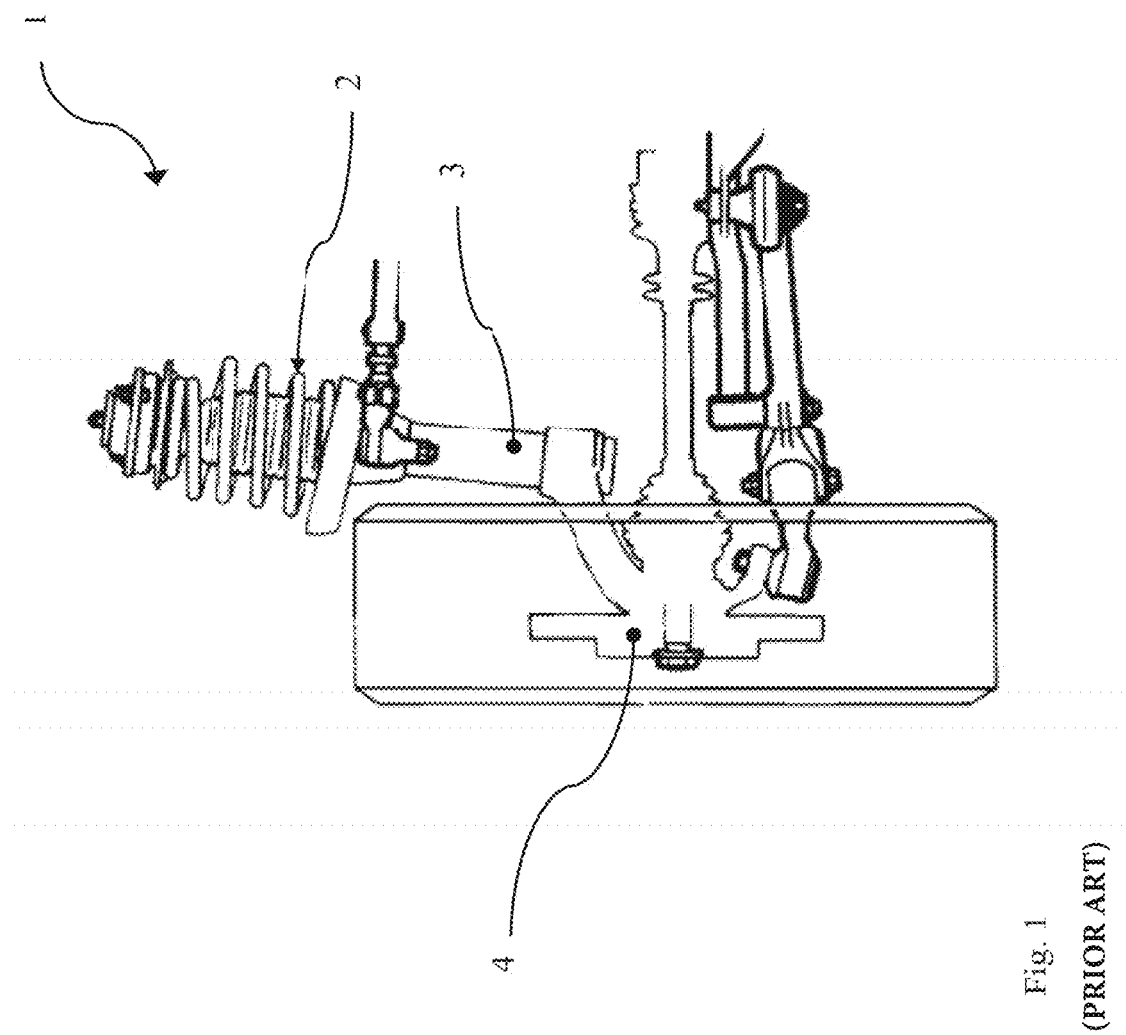
FIG. 1 is a representation of an exemplary conventional strut suspension system.

FIG. 1 illustrates conventional strut assembly 1 which comprises a coil spring 2 and damper 3. The strut assembly 1 is a load bearing element of the suspension that is attached to the wheel hub 4. As a result, the damper 3 is exposed to forces and moments that are transverse to its longitudinal axis.

FIG. 2 illustrates an aspect of an embodiment of the invention. The actuator assembly comprises an actuator body 10 that is slidably received and reinforced by the actuator housing 11. The actuator body volume is divided into compression volume 12 and extension volume 13 by a piston 14. The actuator body may also include a gas filled reservoir 15. The actuator body is configured to slide in the housing in response to road induced forces applied to attachment device 16 and due to pressures generated internally in volumes 12 and 13. The housing 11 may contain an attachment bracket 25. The attachment device 16 and bracket 25 may be adapted so as to connect the actuator assembly to a strut-type suspension assembly, whereby the actuator assembly is coupled to a vehicle chassis (i.e. a sprung mass) and the wheel assembly (i.e. an unsprung mass). Such attachment arrangements are well known in the art and the invention is not limited in this regard. The housing and the actuator body may be adapted so that it can support the forces and moments that are transverse to its longitudinal axis that may be placed upon it due to the strut-type suspension assembly.

At least one bearing 26 may be interposed between the actuator housing 11 and the actuator body 10 so that the actuator body may slide more freely within the housing while supporting the said forces and moments. Such a bearing may comprise a low friction surface, a dual seal hydrobearing with hydraulic fluid trapped between two seals, a ball bearing assembly, or any other suitable bearing that reduces static and/or dynamic friction. The actuator housing 11 may contain a spring support (not shown) that may allow for a spring (a mechanical spring, an air spring or other type of spring) to be coupled between the wheel assembly and the chassis.

The piston rod 17 penetrates an opening in the distal end of the housing. Cap 22 seals extension volume 13 and guides piston rod 17. Piston rod 17 is attached to the housing with collar 18 and fixed in the axial direction. Collar 18 is preferably configured to allow limited radial movement relative to the housing, and may be adapted so that the piston rod is subjected to primarily an axial load thereby substantially alleviating transverse loading. In order to reduce transverse loading on the piston rod 17, other devices may be similarly used so that the attachment may shift in a radial direction while providing stiffness in the axial direction. For example, a sliding disc or pivot joint may be used. In addition, for embodiments that include a moveable attachment piston rod mount 18, a compliant connection between the hydraulic motor-pump (activalve) assembly 27 and the rod ports 19a and 19b may be used. For example, a flexible hose, an intermediate fluid chamber wherein the rod ports empty into chambers which are further in fluid communication with the hydraulic motor-pump, a telescoping fluid channel, or other suitable fluid connection device. While the embodiment of FIG. 2 shows a side-mounted activalve 27, the activalve 27 may also be attached to the piston rod near the base of the assembly such that it is free to pivot with the piston rod. In such an embodiment, the rod ports 19a and 19b may also directly connect between the piston rod 17 and the hydraulic motor-pump.

Fluid may flow into or out of compression volume 12 through piston port 20a and flow tube 21a in hollow piston rod 17 and rod port 19a. Fluid may flow into or out of extension volume 13 through rod port 20b, annular region 21b in hollow piston rod 17, and rod port 19b. A hydraulic motor-pump in an activalve 27 may be installed in the fluid circuit between ports 19a and 19b. Whereby the compression volume 12 is in fluid communication with a first port of the hydraulic motor-pump and the extension volume is in fluid communication with a second port of the hydraulic motor-pump. The hydraulic motor-pump is drivingly connected to an electric motor-generator, to form a hydraulic motor-pump/electric motor-generator assembly. The hydraulic motor-pump is adapted so that when the piston rod moves in a first direction (i.e. a compression stroke), the electric motor-generator rotates in a first rotational direction, and when the piston rod moves in a second direction (i.e. an extension stroke), the electric motor-generator rotates in a second rotational direction. In some embodiments therefore, the motor-generator rotates substantially in lockstep with the motion of the piston rod (not accounting for leakages in the system). During some modes, passive valving may allow the piston rod to move wherein the electric motor-generator is not in lockstep. The electric motor-generator may be adapted so that when electrical power is applied, it will generate a torque that may rotate the electric motor-generator in either a first or second direction to create a force (and/or motion) in either the compression or extension direction, i.e. creating an active force in the second and forth quadrants of the force velocity graph. The electric motor-generator may be adapted so that a resistive torque in the electric motor-generator can create a resistive force in either the compression or extension direction, i.e. creating a resistive (i.e. damping) force in the first and third quadrants of the force velocity domain. It should be appreciated that a controller may merely control a current in the motor and depending on the operating point of the overall system, it will operate at a given point on the force velocity graph. While the first and third quadrants are typically referred to as damping quadrants, energy may be dissipated (or regenerated in recuperative-capable systems such as several embodiments disclosed herein), or for some operating points in the first and third quadrants net energy may be consumed in the motor due to inefficiencies. Similarly, energy may be consumed in the second and third operational quadrants.

Internal reservoir 15 may be included in the actuator body 10. In the embodiment shown, the reservoir is incorporated in the compression volume, but may be incorporated in the extension volume. Alternatively, the reservoir may be located in the fluid circuit at a point that is external to the actuator assembly. Similarly, the reservoir may reside in a concentric cavity about the actuator body or the actuator housing in the case of a multi-tube (i.e. twin-tube or triple tube) topology. The reservoir may contain a compressible medium such as, for example, a gas or foam. In the embodiment shown, the reservoir comprises a gas piston 23 that forms a gas volume in the reservoir and separates it from the compression volume 12. The reservoir may also comprise a gas bag or other type of compressible medium as is well known in the art and the invention is not limited in this regard.

The reservoir functions to take up differences caused primarily by the volume occupied by the rod 17 in rebound (extension) volume 13. The reservoir can also compensate for the expansion or contraction of the fluid in the system due to temperature change or due to fluid loss due to leakage through the seals. The reservoir may contain a pre-charge pressure. The pre-charge pressure will limit the pressure and hence the forces that are generated in the compression volume (or rebound volume depending on the reservoir location), and in some embodiments the pre-charge pressure must be at least equal to the maximum hydraulic pressure in the compression volume (or rebound volume). The gas pre-charge pressure will impart an axial extension force on the piston rod that is equal to the gas pre-charge pressure multiplied by the area of the piston rod and is known as the gas force. If, in an active suspension, high forces are required in both the extension and compression directions, then the gas pre-charge pressure must be adequately high.

The gas force will act in parallel with the suspension supporting spring force to create an overall spring force, and as such the suspension supporting spring force must be adjusted to account for the gas force to achieve, for example, the desired static vehicle ride height. However, the gas force will change due to changes in the pre-charge pressure which may change with, for example, actuator extension and temperature and the change in gas force may adversely affect the overall spring force. It may be, therefore, desirable to reduce the gas force as much as possible. However if in an active suspension a high pre-charge pressure is required, whereby the pre-charge pressure is determined by the required compression or rebound forces, then it is important to keep the piston rod cross-section area to a minimum. By reducing or eliminating any transverse loads on the piston rod and applying a primarily axial force on the piston rod, as mentioned previously, the cross-section area of the piston rod may be reduced as it only needs to resist primarily a buckling load as opposed to a bending moment, therefore reducing the gas force. The embodiment of FIG. 2 comprises an actuator body and housing that are adapted to support transverse loads on the strut while reducing such loads on the piston rod. This allows the piston rod diameter to be reduced.

Passive valves (such as diverter valves for example) or semi-active valving (such as solenoid operated valves) may be placed in the fluid circuit in parallel or in series with the hydraulic motor-pump, and may be configured to limit the maximum rotational velocity of the hydraulic motor-pump and/or the maximum pressure within the compression or extension volumes. The valving may be located in the actuator assembly, in the hydraulic motor-pump/electric motor-generator assembly, or elsewhere. Such valving is well known in the art and the invention is not limited in this regard.

In the embodiment shown in FIG. 2, the actuator assembly and the hydraulic motor-pump/electric motor-generator assembly are configured as a compact single body construction thereby eliminating external hydraulic connections of, for example, flexible hoses, etc. and therefore reducing the installation cost, and facilitating the integration of the active suspension strut system into the vehicle.

Figure 3A:
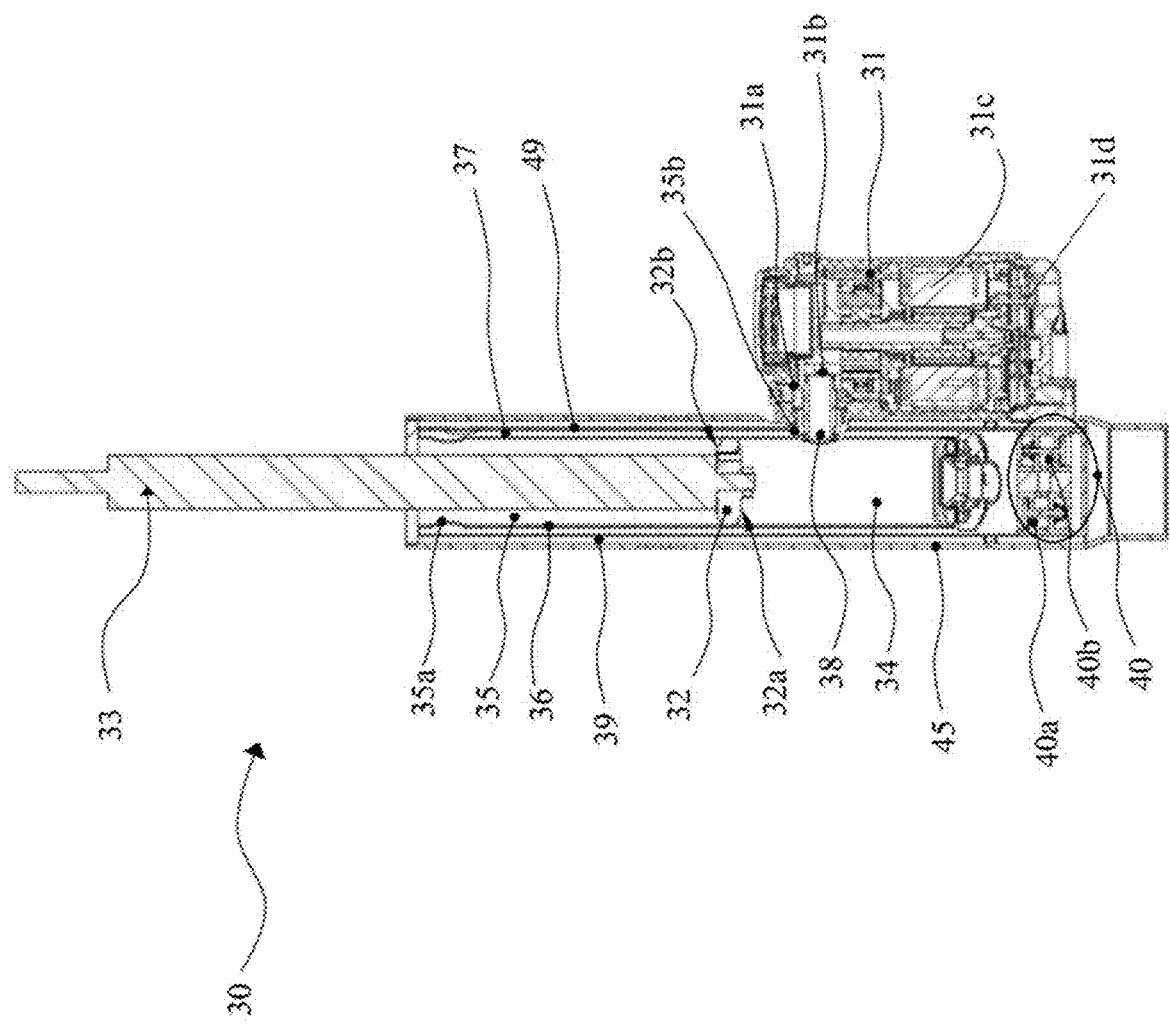
FIG. 3a is a representation of an exemplary low pressure hydraulic circuit with an active suspension actuator.

FIG. 3a illustrates another embodiment wherein a large diameter piston rod may be used to provide structural rigidity. The actuator assembly 30, which represents the active portion of a strut, is in fluid communication with hydraulic motor-pump 31. Piston 32 is attached to rod 33 and separates compression volume 34 from extension volume 35. The piston in hydraulic cylinder 36 moves in response to external forces applied to rod 33 and the balance of hydraulic forces applied to the front face 32a and rear face 32b of the piston. The actuator assembly comprises mounting features at the housing 45 and the piston rod 33 (not shown) so that the actuator assembly may be connected to a strut-type suspension assembly, whereby the actuator assembly is coupled to a vehicle chassis (i.e. a sprung mass) and the wheel assembly (i.e. an unsprung mass). Such attachment arrangements are well known in the art and the invention is not limited in this regard. The housing and the piston rod assembly may be adapted so that it can support the forces and moments that are transverse to its longitudinal axis that may be placed upon it due to the strut-type suspension assembly.

Annular volume 37 allows fluid to flow from extension volume 35 through ports 35a and 35b to a first port of the hydraulic motor-pump 31. Fluid from compression volume 34 flows to a second port of hydraulic motor-pump 31 through port 38. Hydraulic motor-pump 31 is drivingly connected to electric motor-generator circuitry such as an H-bridge motor controller. The combination of the hydraulic motor-pump and electric motor-pump with electric driver/controller (not shown) is used to alternatively absorb energy from the motion of the piston or provide energy to it, thus controlling its motion. The motion of the piston is synchronized with the operation of the motor pump. Therefore in some embodiments energy or current flow may be bidirectional between the electric motor-generator and the electric driver/controller.

Because of the differences in the swept volume of the front piston face 32a and rear piston face 32b, the amount of fluid flowing through port 35b is not equal to that flowing through port 38. The difference is made up by reservoir 39. Hydraulic liquid flowing into the reservoir compresses the gas (or other compressible medium) in the reservoir. The liquid and gas in the reservoir may form a direct interface or may be separated by, for example, a diaphragm, gas filled bag or piston. Alternatively, the gas expands as fluid leaves the reservoir. In the embodiment shown, reservoir 39 is formed by the annular volume formed between the housing 45 and a middle tube 49, so that the reservoir is internal to the actuator assembly. In alternate embodiments, the reservoir may be located elsewhere in the actuator assembly or external to the actuator assembly.

Valving system 40 is located in the fluid circuit parallel to the ports of hydraulic motor-pump 31. The valving system can be used to alternately connect the reservoir such that it is in fluid communication with one or the other of the motor-pump ports (note this connection may be through one or more valves, restrictions, chambers, or similar). Preferably the valving system in this embodiment ensures the reservoir is substantially always connected to the port with the lower pressure.

Valves 40a and 40b may be pilot operated valves that are activated based on pressure at ports 31a and 31b. In this embodiment, when pressure at port 31a is greater than pressure at port 31b, valve 40b opens so that the reservoir 39 is in fluid communication with the compression volume 34, while valve 40a is closed. However, when pressure at port 31b is greater than the pressure at port 31a, then pilot valve 40a is open so that the reservoir 39 is in fluid communication with the extension volume 35, while valve 40b is closed. In a similar embodiment, a single shuttle valve with dual pilot ports on each side of the moveable slider may be used to selectively communicate fluid from the reservoir 39 to one of the compression and extension volumes (which are in fluid communication with respective ports of the hydraulic motor-pump 31). Alternative valve configurations may be used and may include, for example, an electronically controlled valve (such as a solenoid valve), a pressure actuated valve (such as a blowoff or pilot-operated valve), an inertial valve (such as a spool valve actuated by external inertial force), or some combination of valves and other fluid control devices. A pilot valve may be a pilot operated shuttle valve.

Also, as an alternative, annular volume 37 may be eliminated and port 35a may be connected directly to port 35b. In some embodiments, the valving to keep the low pressure reservoir on the low pressure side of the hydraulic motor-pump 31 may additionally include secondary valving or features such as damping and cross-fluid-communication bleed ports in order to reduce noise, vibration, and harshness associated with switching the reservoir between fluid volumes.

In FIG. 3a, the motor-pump 31 is shown outside the actuator assembly 30. Alternatively, the motor-pump 31 and the electric motor-generator may be incorporated with the piston 32 or elsewhere in the cylinder 36 such as at the base (bottom) of the housing. In the embodiment depicted in FIG. 3a, the valve system 40 is adapted so that the reservoir is in fluid communication with the motor-pump port (and hence the respective compression or extension volume) that is at the lower pressure. Thereby, the pressure in the reservoir is not determined by the required maximum operating pressure within either the compression or extension volume, as is the case in the embodiment of FIG. 2, therefore allowing for a low reservoir pre-charge pressure. The low pre-charge pressure reduces the gas force (as described previously) and as such allows for a large diameter piston rod to be used so that it can withstand the longitudinal forces and moments that may be imparted upon it from the strut type suspension configuration. Such a configuration may have improved durability and lower manufacturing cost.

Passive valves (such as diverter valves for example) or semi-active valving (such as solenoid operated valves) may be placed in the fluid circuit in parallel or in series with the hydraulic motor-pump, and may be configured to limit the maximum rotational velocity of the hydraulic motor-pump and or the maximum pressure within the compression or extension volumes. The valving may be located in the actuator assembly or the hydraulic motor-pump/electric motor-generator assembly. Such valving is well known in the art and the invention is not limited in this regard.

In the embodiment shown in FIG. 3, the actuator assembly, the valve system and the hydraulic motor-pump/electric motor-generator assembly and reservoir, may be configured as a compact single body construction thereby eliminating external hydraulic connections of, for example, flexible hoses, etc. and therefore reducing the installation cost, and facilitating the integration of the active suspension strut system into the vehicle.

FIG. 3b is a detailed view of a pilot operated valve 40a that may be used in valving system 40 shown in FIG. 3a. The valve system 40a comprises a first port 41 and a second port 42 located in a body 43, a pilot chamber 44, a pilot diaphragm 45, a sealing element 46, a connecting member that couples the diaphragm to the sealing element, and a spring element 47. The body contains a sealing surface 48. The spring element 47 applies a force to the sealing element so that the sealing element is in contact with the sealing surface 48 in the body, to provide at least a partial fluid seal.

The valve is adapted so that in a first mode, if the pressure in the first port is higher than that of the pressure in the second port, pressure in the first port will act upon the first side 46a of the sealing element 46 to unseat the sealing element from the sealing surface, thereby allowing fluid flow from the first port to the second port—regardless of the pressure in the pilot chamber 44. In a second mode, fluid flow from the second port to the first port is at least partially blocked by the sealing element forming at least a partial seal with the sealing surface when the pressure in the pilot chamber is below a threshold. In a third mode, there is fluid flow from the second port to the first port when pressure in the pilot chamber reaches, or is above, a threshold. In the second mode, pressure in the second port will act upon the second side 46b of the sealing element generating an axial force that will act in parallel with the spring force to generate a sealing axial force. The sealing axial force will act upon the sealing surface so that it is in contact with the sealing surface in the body to provide at least a partial fluid seal from the second port to the first port. In the third mode however, pressure in the pilot chamber will act upon the diaphragm to generate an unseating axial force, opposing the sealing axial forces from the spring element and the pressure in the second port. The unseating axial force is transmitted to the sealing element via the connecting member, and when a threshold pressure is reached in the pilot chamber, the unseating axial force will overcome the sealing axial force and unseat the sealing element from the sealing surface, thereby allowing fluid to flow from the second port to the first port.

In the embodiment depicted, the first port is in fluid communication with the reservoir, the second port is in fluid communication with either the compression volume or the extension volume. If the second port is in fluid communication with the compression volume, the pilot chamber is in fluid communication with the extension volume, and if the second port is in fluid communication with the extension volume, the pilot chamber is in fluid communication with the compression volume.

Although in the embodiment shown a spring element is used to provide a partial sealing axial force to help the sealing element form a seal against the sealing surface, the diaphragm itself may be adapted to provide at least a partial sealing axial force. It is also possible to rely solely upon the pressure in the second port acting upon the second side of the sealing element to provide the sealing axial force, and the invention is not limited in this regard.

In the embodiment shown, a diaphragm is disclosed to generate the unseating axial force from the pressure in the pilot chamber. This diaphragm may be constructed from a metallic material, an elastomeric material or other type of material. The diaphragm may be replaced by a piston or disk or other type of element or device to transmit the unseating force from the pressure in the pilot chamber, and the invention is not limited in this regard.

Figure 4:
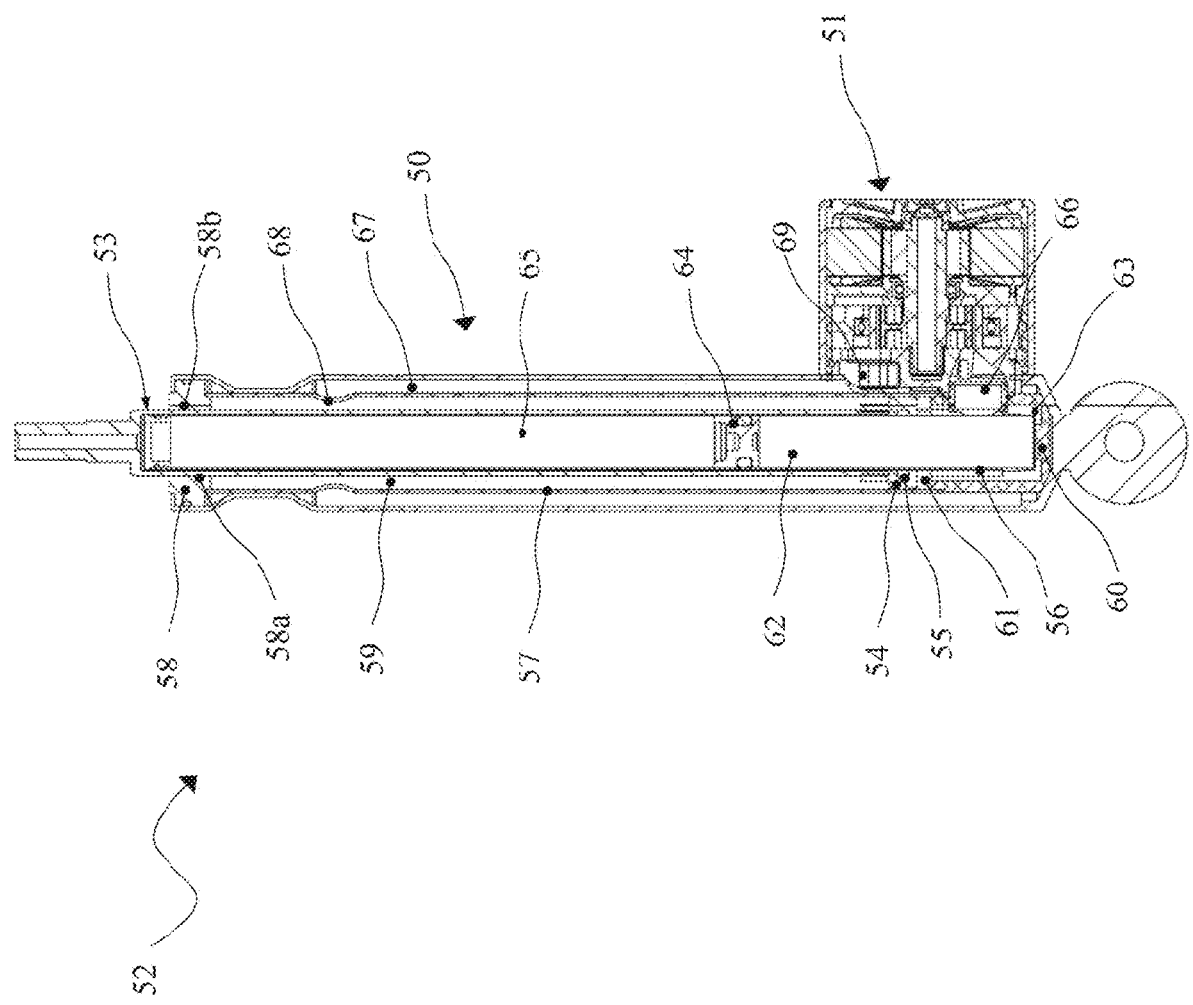
FIG. 4 is a representation of an exemplary actuator assembly with an active valve and an actuator including an annular piston with an internal accumulator and reservoir.

FIG. 4 illustrates an aspect of yet another embodiment of the invention. The actuator assembly 50, and hydraulic motor-pump/electric motor-generator assembly (herein called "activalve" 51"), are consolidated in a single body housing 52. The piston rod 53 is annular in construction. Annular piston 54 is rigidly attached to the distal end of annular piston rod 53 (or may be formed from the annular piston rod). The bore of the annular piston head contains a seal 55 that seals against the outside surface of an inner tube 56. The outside diameter of the annular piston 54 is greater than that of the piston rod outside diameter. The outside cylindrical surface of the piston head contains a seal that seals against the inside diameter of a pressure tube 57. A rod guide 58a and rod seal 58b seals between the inside diameter of the pressure tube 57 and the outside of annular piston rod 53 to form an annular extension volume 59.

A seal block 60 seals one end of the annular space between the inside surface of the pressure tube and the outside surface of the inner tube to form an annular compression volume 61. The inner tube contains an accumulator 62 that is in fluid communication with the compression volume 61, via passages or ports 63 in seal block 60. Alternatively, openings (not shown) in the inner tube may be utilized for fluid transfer between the accumulator 62 and compression volume 61. A floating piston 64 separates the accumulator from reservoir 65 that contains a compressible medium. The accumulator is preferably sized such that it can at least accept fluid displaced by the annular rod. The compression volume 61 is in fluid connection with a first port 66 of the hydraulic motor-pump.

The annular passage 67 is in fluid communication with the extension volume 59, by means of passages or ports 68 in the pressure tube 57. Alternatively, this fluid communication may be attained by using passages in rod guide 58. The annular volume is in turn in communication with a second port 69 of the hydraulic motor-pump of the activalve 51.

The activalve is adapted so that when piston rod moves in a manner that enlarges compression volume 61, fluid flows from the annular extension volume 59, through the annular passage 67, to port 69 of the hydraulic motor-pump of the activalve 51. Fluid then flows out of port 66 of the hydraulic motor-pump of the activalve to the compression volume 61. Simultaneously, the volume of the displaced annular piston rod 53 is replenished from fluid flow from the accumulator 62 to the compression volume 61.

When the actuator assembly 50 is in compression, fluid will flow from the compression volume to port 66 of the hydraulic motor-pump of the activalve 51, and will flow out of port 69 of the hydraulic motor-pump of the activalve 51, to the annular extension volume 59. The fluid volume displaced by the introduction of the annular rod is accepted by the accumulator 62 in the inner tube.

A volume exists between the inside surface of the annular piston rod 53 and the outside surface of the inner tube 56 that is a 'dead volume' and does not significantly affect the operation of the damper. This volume can be vented to the atmosphere via a passage at the near end of the annular piston rod 53 or can be filled with a gas at or near atmospheric pressure when the actuator assembly 50 is at full compression. The trapped gas will then expand as the piston rod 50 is withdrawn so that the gas pressure falls below this initial charge pressure.

As mentioned previously, it is desirable to keep the gas force to a minimum and by the proper selection of the annular piston rod inside and outside diameters, it is possible to have a small annular area (that is similar to that of conventional monotube dampers) and yet have the annular piston rod have the structural rigidity similar to that of conventional passive strut dampers, making the arrangement of FIG. 4 suitable for strut applications without the penalty of high gas forces from a large piston rod. This arrangement also has the further advantage that the accumulator volume is contained inside the annular piston rod, thereby not impacting the 'dead length' of the damper or requiring an external accumulator.

FIG. 5*a* illustrates an aspect of yet another embodiment of the invention. Actuator assembly 70 having substantially cylindrical housing 71 slidably receives annular piston rod 72. Annular piston 73 is attached to the distal end of piston rod 72 and forms a seal against the inner cylinder surface of housing 71.

Guide 74 is sealably attached to the inner cylindrical surface of housing 71 and seals against the outer cylindrical surface of piston rod 72. An annular volume is defined by the inner cylindrical surface of the housing 71 and the outer cylindrical surface of piston rod 72. Annular surface 73*a* of piston 73 and annular surface 74*a* of guide 74 is the rebound (extension) volume 75 of the actuator assembly 70. Cylindrical inner tube 76 is attached to the substantially cylindrical housing 71 at its distal end. Seal 77 is attached to the outer surface of inner tube 76 at its near end and seals against the cylindrical inner surface of piston rod 72 defining a compression volume 78. The fluid in compression volume 78 exerts an axial force on piston rod 72 that is equal to the product of the pressure in compression volume 78 with the area of circular section 79.

The axial force exerted on piston rod 72 by the pressure of the fluid in rebound (extension) volume 75 is equal to the pressure in rebound (extension) volume 75 multiplied by the annular area 73*a*. Therefore, if the pressure in extension volume 75 is equal to the pressure in compression volume 78, and areas 73*a* and 79 are equal, then there would be no net axial force on piston rod 72. Furthermore, if the annular area 73*a* is equal to circular area 79, then volume displaced in the extension volume as a result of the outward motion of the piston rod is equal to the change in the size of the compression volume.

However, because of manufacturing tolerances, it is likely that the changes in these volumes will not balance precisely and the use of a small reservoir in the fluid circuit is preferred to accommodate any changes in these volumes. Compression volume 78 is in fluid communication with a first port of hydraulic motor-pump 80. Rebound volume 75 is in fluid communication with a second port of hydraulic motor-pump 80. Hydraulic motor-pump 80 is drivingly connected to an electric motor-generator. The hydraulic motor-pump 80 can be driven in one direction to draw fluid from the compression volume and force it into the extension volume exerting a force on the piston in the rebound (outward) direction. The process could be reversed by reversing the direction of the hydraulic motor-pump.

As explained above, minor differences may exist between annular area 73*a* and circular area 79, for example, because of manufacturing tolerances. Therefore, when the piston moves in one direction, there could be an excess of fluid in the fluid circuit and a deficit of fluid when it is moved in a reverse direction. Under certain circumstances, such as change in temperature, fluid may again have to be removed or added to the circuit. It is, therefore, desirable to include reservoir 81. Reservoir 81 is fluidly connected at a convenient point in the fluid circuit but preferably in close proximity to the first or second port of hydraulic motor-pump 80. The reservoir may be connected via check valves 82*a* and 82*b* that will allow fluid to be withdrawn from the fluid circuit or replenished to it respectively. The reservoir may contain a compressible medium such as, for example, a gas, foam or spring and diaphragm, or may also comprise a gas bag or other type of compressible medium as is well known in the art and the invention is not limited in this regard.

If a valve is used to allow fluid flow in the direction from the hydraulic circuit to the reservoir, then this valve must also allow for adequate pressure to be generated in the hydraulic circuit to create the desired maximum compression or rebound forces. This can be achieved in several ways, such as: the valve might be a relief type valve whereby fluid flow is substantially blocked from the hydraulic circuit to the reservoir until a pressure threshold is reached, whereby the pressure threshold is equal to or greater than the maximum desired pressure generated in either the compression or rebound chambers; the valve could offer a flow restriction (by means of an orifice, for example, or other means), whereby this flow restriction would offer a small pressure drop under small flow rates (such as due to thermal expansion or area mismatch), but then offer a large pressure drop (and hence flow restriction) under higher flow rates such as when the actuator assembly is under a compression or rebound stroke. Other forms of valve can achieve similar functionality and these types of devices are well known in the art, and the invention is not limited in this regard.

It is possible that the reservoir could be in direct fluid communication with the hydraulic circuit without the use of valves, whereby the pre-charge pressure of the reservoir is such that the desired maximum pressures in the compression and rebound volumes can be attained. As the compression and rebound areas are substantially similar, a high reservoir pre-charge pressure results in little or no gas force.

A volume 83 exists between the inside surface of the housing 71 and the outside surface of the cylindrical inner tube 76 that is a 'dead volume' and does not significantly affect the operation of the damper. This volume can be vented to the atmosphere via a passage in the housing or can be filled with a gas at or near atmospheric pressure when the actuator assembly 70 is at full compression. The trapped gas will then expand as the piston rod 72 is withdrawn so that the gas pressure falls below this initial charge pressure.

The housing and annular piston rod combination may be adapted so that it can support the forces and moments that are transverse to its longitudinal axis that may be placed upon it due to its use in a strut-type suspension assembly.

Figure 5B:
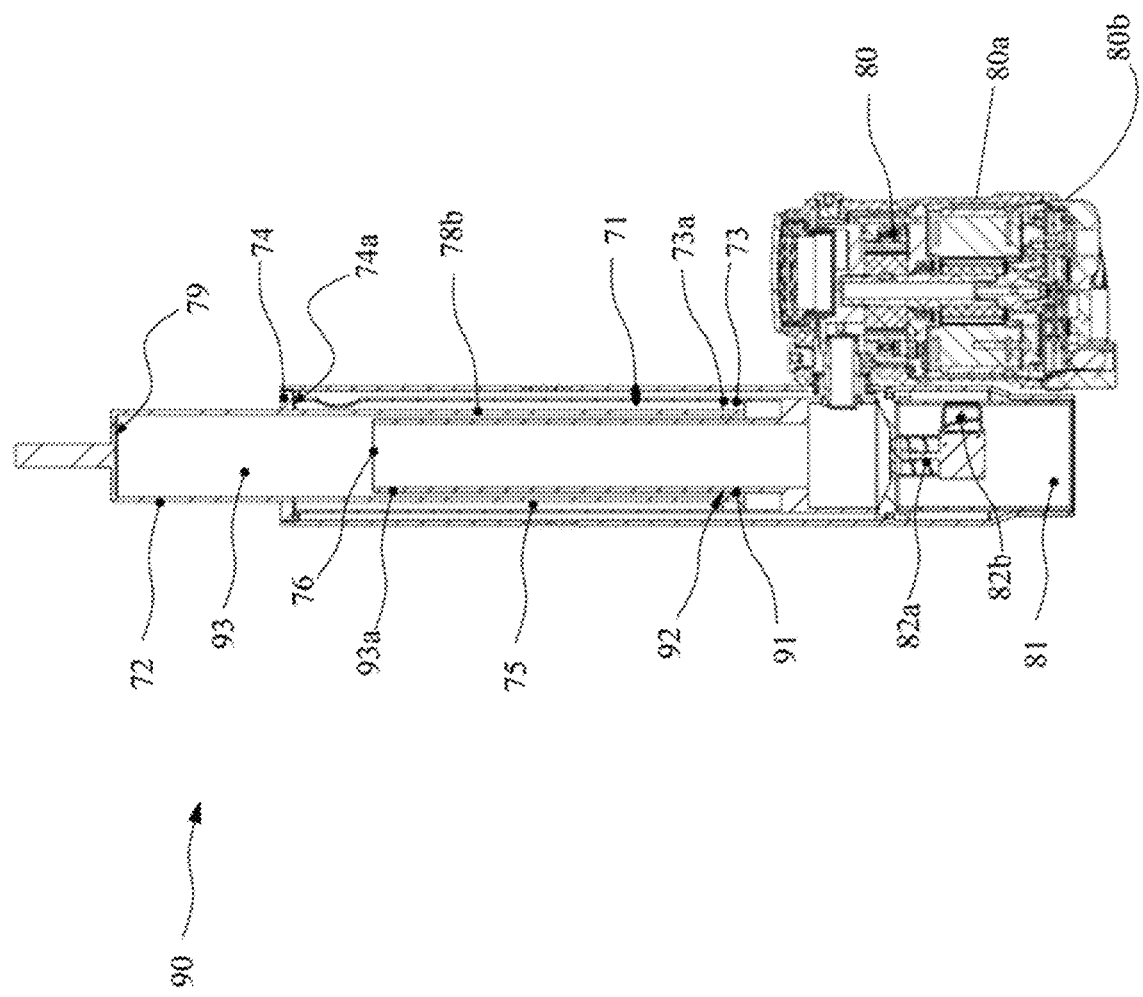
FIG. 5b is a representation of a second exemplary active strut hydraulic circuit with an actuator including an annular piston and piston rod.

FIG. 5b illustrates an aspect of still another embodiment of the invention. The actuator assembly 90 is similar to the actuator of FIG. 5a. The elements in FIG. 5b that are the same as corresponding elements in FIG. 5a are numbered accordingly.

The principal differences between the embodiments of FIGS. 5a and 5b are that an annular seal 91 has been added in FIG. 5b and seal 77 that was present in the embodiment of FIG. 5a is not used in the apparatus of FIG. 5b.

Seal 91 is attached to the inner cylindrical surface of annular piston 72 and seals against the outer cylindrical surface of inner tube 76, whereas the seal 77 seals against the inner diameter of annular piston 72. Using a seal that seals against an outer cylindrical surface as opposed to an inner diameter is preferred in terms of manufacturability and cost, as it is easier to manufacture a smooth running, close tolerance surface suitable for a hydraulic seal on an outer profile as opposed to an inner profile.

The annular volume defined by the inner cylindrical surface of the housing 71, the outer cylindrical surface of piston rod 72, the annular surface 73a of piston 73 and the annular surface 74a of guide 74 is the rebound (extension) volume 75 of the actuator assembly 70. Cylindrical inner tube 76 is attached to the substantially cylindrical housing 71 at its distal end. The fluid compression volume 93 of the embodiment in FIG. 5b includes the annular region 93a. The fluid in compression volume 93 exerts an axial force on piston rod 72 that is equal to the product of the pressure in compression volume 93 with the area of circular section 79 minus pressure in compression volume 93 with the area of circular section 92.

The axial force exerted on piston rod 72 by the pressure of the fluid in rebound (extension) volume 75 is equal to the pressure in rebound (extension) volume 75 multiplied by the annular area 73a. Therefore, if the pressure in the rebound (extension) volume 75 is equal to the pressure in compression volume 93, and area 73a is equal to area 79 minus area 92, then there would be no net axial force on the piston rod 72. Furthermore, if the annular area 73a is equal to circular area 79 minus area 92, then the volume displaced in the rebound (extension) volume as a result of the outward motion of the piston rod is equal to the change in the size of the compression volume.

Figure 6:
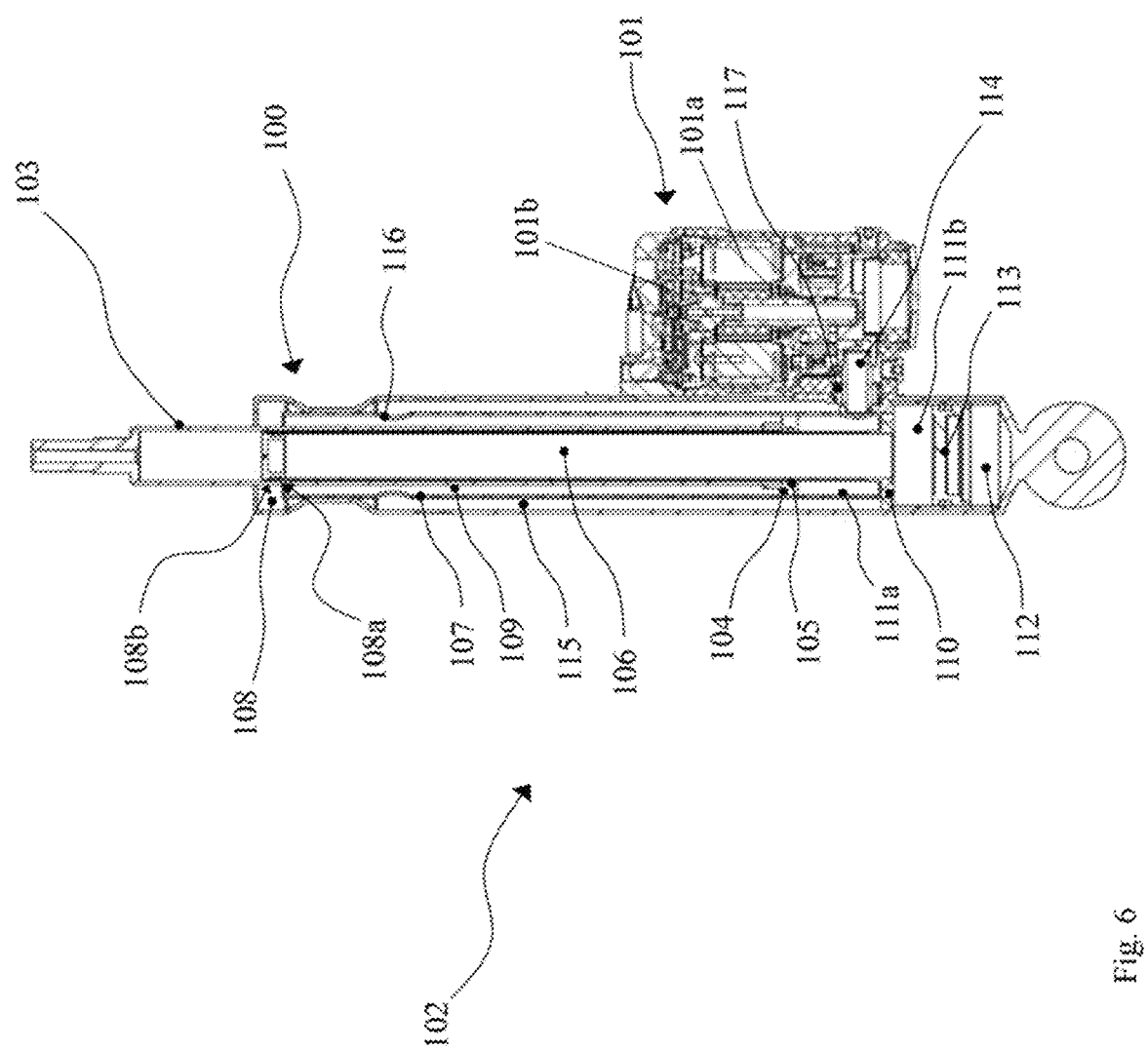
FIG. 6 is a representation of an exemplary hydraulic actuator with an annular piston and piston rod.

However, because of manufacturing tolerances, it is likely that the changes in these volumes will not balance precisely and the use of a small reservoir in the fluid circuit is preferred. The arrangements of the reservoir may be similar to that of the embodiment of FIG. 5a FIG. 6 illustrates an aspect of yet another embodiment of the invention. The actuator assembly 100 and hydraulic motor-pump/electric motor-generator assembly (herein called "activalve" 101) are consolidated in a single body housing 102. The piston rod 103 is annular in construction. Annular piston 104 is rigidly attached to the distal end of annular piston rod 103 (or may be formed from the annular piston rod). The bore of the annular piston head contains a seal 105 that seals against the outside surface of an inner tube 106. The outside diameter of the piston head 104 is greater than that of the piston rod outside diameter. The outside cylindrical surface of the piston head contains a seal that seals against the inside diameter of a pressure tube 107. A rod guide 108a and rod seal 108b seals between the inside diameter of the pressure tube 107 and the outside of annular piston rod 103 to form an annular extension volume 109.

A seal plate 110 seals one end of the annular space between the inside surface of the pressure tube and the outside surface of the inner tube to form an annular compression volume 111a and a compression volume 111b. Seal plate 110 is pervious and allows fluid to flow freely between compression volumes 111a and 111b. Reservoir 112 is at least partially filled with a compressible material. The reservoir is preferably separated from volume 111b by piston 113. The reservoir is preferably sized such that it can at least accept fluid displaced by the annular rod. The compression volume 111a is in fluid connection with a first port 114 of the hydraulic motor-pump. The annular passage 115 is in fluid communication with the extension volume 109, by means of passages or ports 116 in the pressure tube 107. Alternatively, this fluid communication may be attained by using passages in rod guide 108. The annular volume is in turn in communication with a second port 117 of the hydraulic motor-pump of the activalve 101.

The activalve is adapted so that when the piston rod moves in a manner that enlarges compression volume 111, fluid flows from the annular extension volume 109, through the annular passage 115, to port 117 of the hydraulic motor-pump of the activalve 101. Fluid then flows out of port 114 of the hydraulic motor-pump of the activalve to the compression volume 111a. Simultaneously, the volume of the displaced annular piston rod 103 is replenished from fluid flow from the compression volume 111b to the compression volume 111a.

When the actuator assembly 100 is in compression, fluid will flow from the compression volume to port 114 of the hydraulic motor-pump of the activalve 101, and will flow out of port 117 of the hydraulic motor-pump of the activalve 101, to the annular extension volume 109. The fluid volume displaced by the introduction of the annular rod is accepted by the volume 111b.

A volume exists between the inside surface of the annular piston rod 103 and the outside surface of the inner tube 106 that is a 'dead volume' and does not significantly affect the operation of the damper. This volume can be vented to the atmosphere via a passage at the near end of the annular piston rod 103 or can be filled with a gas at or near atmospheric pressure when the actuator assembly 100 is at full compression. The trapped gas will then expand as the piston rod 100 is withdrawn so that the gas pressure falls below this initial charge pressure.

As mentioned previously, it is desirable to keep the gas force to a minimum and by the proper selection of the annular piston rod inside and outside diameters, it is possible to have a small annular area (that is equal in area to that of conventional monotube dampers) and yet have the annular piston rod have the structural rigidity similar to that of conventional passive strut dampers, making the arrangement of FIG. 6 suitable for MacPherson strut applications without the penalty of high gas forces from a large piston rod.

Figure 7A:
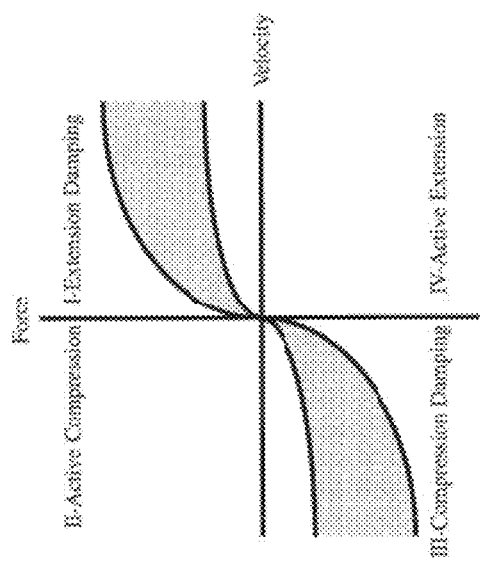
FIG. 7a is an exemplary force/velocity graph for a conventional semi-active suspension system.
Figure 7B:
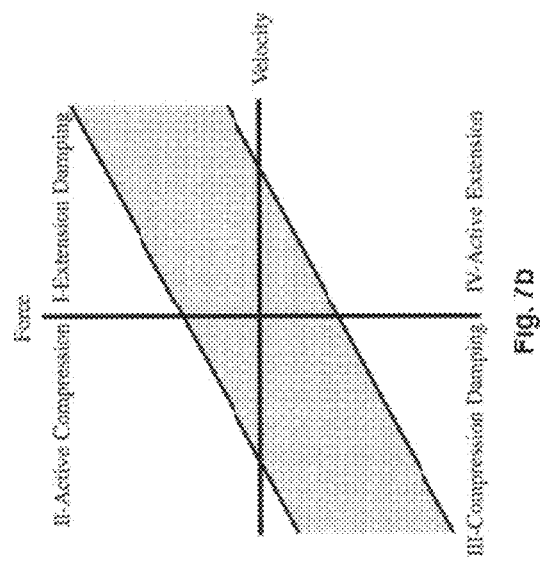
FIG. 7b is an exemplary force/velocity graph for an active suspension system using four-quadrant control.

FIGS. 7a and 7b present plots of various ways to control a hydraulic actuator integrated into a suspension system within a force velocity domain. As illustrated in the figures, the force velocity domain includes a first quadrant I corresponding to rebound (extension) damping where a force is applied by the hydraulic actuator to counteract rebound (extension) of hydraulic actuator. Similarly, quadrant III corresponds to compression damping where a force is applied by the hydraulic actuator to counteract compression of the hydraulic actuator by a compressive force. In contrast, quadrants II and IV correspond to active compression and active extension of the hydraulic actuator where it is driven to a desired position or with a desired force.

In some embodiments, a fully active system operated in at least three of the four quadrants of a force velocity domain provides bidirectional energy flow. More specifically, in at least a portion of quadrants I and III, energy is regenerated by the electric motor-generator being driven during compression damping and rebound (extension) damping, and in quadrants II and IV energy is applied to and consumed by the electric motor-generator to actively extend or compress the hydraulic actuator. Energy being regenerated refers to net energy being delivered from the electric motor to/through the motor controller, and it is not necessarily transferred to an outside load (e.g. it may be intentionally dissipated in the windings of the motor). Such a hydraulic actuation system may be particularly beneficial as compared to previous hydraulic actuation systems integrated with a suspension system because it does not require the use of separate actively controlled valves to control the flow of fluid to and from various portions of the hydraulic actuator body. In other embodiments, electronically controlled valves may be used to create a dissipating force in quadrants I and III. In such systems, energy might only be consumed.

While embodiments of a hydraulic actuator as described herein are capable of operating in all four quadrants of the force velocity domain, the energy delivered to the hydraulic actuator is controlled by the force, speed and direction of operation of the electric motor-generator and hydraulic motor-pump. In some embodiments the force from the actuator is directly controlled by controlling a current or other characteristic in the electric motor-generator. In some embodiments, when an active actuator force is commanded, energy may consumed on demand. More specifically, the electric motor-generator and the hydraulic motor-pump, as well as other associated components, continuously reverse operation directions, accelerate from one operation speed to another, and go from a stop to a desired operation speed throughout operation of the hydraulic actuator. Consequently, a response time of the hydraulic actuator will include delays associated with the ability of these various components to quickly transition between one operation state and the next. This is in comparison to systems that simply open and close valves associated with a hydraulic line including a constant flow of fluid and/or pressure to control an associated hydraulic actuator. Therefore, in some embodiments, it is desirable to design a system to provide a desired response time in order to achieve a desired system performance while taking into account response delays associated with other devices as well.

Accelerometers and similar sensors are typically used in semi-active and fully-active suspensions in order to monitor vehicle body and wheel motion. According to one embodiment, an active suspension strut is configured to operate with a reduced number of sensors (such as accelerometers and wheel position sensors), or in some cases, with no accelerometers at all. In such an embodiment, a controller is electrically connected to the electric motor-generator. The controller contains voltage and/or current sensors on the phase windings of the motor (such as two or three sets of sensors for a 3-phase BLDC motor) such that it can sense motor rotation, current, and voltage. Optionally, a rotary encoder or other rotational position sensor may be used. In many of the embodiments disclosed above, the piston is preferably in substantial lockstep with the movement of the hydraulic motor-pump (and thus the electric motor-generator). As a result, the controller can estimate movement of the piston in relation to movement of the electric motor-generator. The correlation between wheel and body movement may comprise a model-based algorithm, function, or lookup table. A vehicle dynamics algorithm may be running on the active suspension strut (motor) controller or another controller on the vehicle, and it may use the wheel or body movement estimate, based on the motor rotation/position, to control the vehicle or wheel dynamics. In such a way, by sensing the motor kinematics and/or state, the kinematics and/or state of the vehicle and wheels may be determined. This may allow a reduced number of sensors.

While the above descriptions discuss a hydraulic motor-pump, it should be appreciated that any hydraulic motor-pump may be utilized. In some embodiments this is a positive-displacement hydraulic pump such as a gerotor that may be reversed (directionally) and may operate as both a hydraulic pump or as a hydraulic motor. In other embodiments it may only be one of these two. Similarly, the electric motor-generator may be capable of both motoring and generating (for example, a BLDC motor), or it may only be one of these two.

While the above descriptions discuss strut suspension arrangements such as a MacPherson strut, any suspension that requires the damper or active suspension actuator to take a structural load (including in addition to the longitudinal load) may benefit from the embodiments described herein. The embodiments disclosed describe several methods to accomplish a fully-active suspension strut, however, other embodiments exist and the invention is not limited in this regard. For example, a configuration may be used that includes a through piston rod, wherein the piston rod in the strut assembly emanates from both ends of the actuator housing such that the piston rod volume in the fluid filled chamber does not change with respect to the extended/compressed position of the rod.

While the embodiments disclosed demonstrate activalve placement in specific locations, concepts from different embodiments may be combined in a variety of ways. For example, the activalve may be located on the piston head, side-mounted to the actuator housing, in the base of the actuator housing, attached to the opposite of the piston rod from the piston head, externally mounted with fluid connections, or any other suitable location. Similarly, the reservoir (sometimes called an accumulator) may be located in a variety of locations and via a number of configurations such as in a concentric tube of the actuator, in the base (compression volume) of the housing, as a separate device attached to the activalve or external to the assembly, or any other suitable location/configuration. While some embodiments are described as cylindrical housings, the invention is not limited in this regard and other shapes may be used.

The invention has been described in terms of functional principles and illustrations of specific embodiments. Embodiments described herein, including descriptions of the figures, are merely intended as exemplary, but the concept of the invention is not limited to these embodiments. On the contrary, the present teachings encompass various alternatives, modifications, and equivalents, as will be appreciated by those of ordinary skill in the art. The following claims are not limited to or by the described illustrative embodiments, figures, and stated objectives of the invention or the abstract.

What is claimed is:

1. An active suspension actuator system, comprising:
a hydraulic motor-pump with a first port and a second port;
an actuator assembly including:
a pressure tube with a first end and a second end;

a piston slidably received in the pressure tube, wherein an internal volume of the pressure tube is separated by the piston into a rebound chamber and a compression chamber; and a piston rod with a first end attached to the piston and a second end that protrudes from the second end of the pressure tube, wherein the rebound chamber includes an annular rebound volume and the compression chamber includes an annular compression volume; and a reservoir at least partially filled with a compressible medium;

wherein the compression chamber is fluidly connected to the first port and the rebound chamber is fluidly connected to the second port.

2. The system of claim 1 wherein the reservoir is incorporated in the actuator assembly and in fluid communication with the first port or the second port.

3. The system of claim 2 wherein the compressible medium is at least partially a gas.

4. The system of claim 3 wherein the gas is selected from the group consisting of nitrogen, argon, and air.

5. The system of claim 2 wherein the reservoir is separated from the compression volume by a floating piston.

6. The system of claim 1 wherein the actuator assembly is a suspension strut.

7. The system of claim 1 wherein the actuator assembly is configured to be a structural member of a suspension system of a vehicle and to support a force in a direction transverse to a longitudinal axis of the actuator assembly.

8. The system of claim 1 wherein the hydraulic motor-pump is a gerotor hydraulic motor-pump that is drivingly connected to an electric motor-generator.

9. The system of claim 1 further comprising controller electronics, wherein the actuator assembly, the hydraulic motor-pump, an electric motor-generator and the controller electronics form an integral unit.

10. The system of claim 1 wherein the actuator assembly is configured to operate in at least three of four quadrants of a force velocity domain of the actuator assembly.

11. The system of claim 1 wherein the first end of the pressure tube is proximate to an associated wheel assembly.

12. The system of claim 1 further comprising an inner tube disposed at least partially within the pressure tube and the piston rod, wherein the rebound chamber is formed between the piston rod and the pressure tube, and wherein the compression chamber is formed between the inner tube and the pressure tube.

13. The system of claim 1 wherein the piston is an annular piston and the piston rod is an annular piston rod.

* * * * *